United States Patent [19]

Schouten

[11] Patent Number: 4,869,162
[45] Date of Patent: Sep. 26, 1989

[54] COUNTERFLOW COOLER FOR PELLETS

[75] Inventor: Gijsbert G. Schouten, Vorden, Netherlands

[73] Assignee: Technostaal Schouten, Inc., Lenexa, Kans.

[21] Appl. No.: 197,146

[22] Filed: May 23, 1988

[51] Int. Cl.[4] .................... A23K 1/00; A23N 17/00; F26B 17/14

[52] U.S. Cl. ........................... 99/471; 34/168; 34/172; 414/287

[58] Field of Search .......... 99/467, 468, 471, 472–473, 99/474, 483, 516, 517, 485; 34/167, 168, 172, 185; 222/459, 561, 282; 414/287, 288

[56] References Cited

U.S. PATENT DOCUMENTS

| | | | |
|---|---|---|---|
| 1,158,624 | 11/1915 | Brantingham | 34/176 |
| 1,276,044 | 8/1918 | Ellis | 34/174 |
| 2,148,946 | 2/1939 | Hubmann et al. | 34/168 |
| 2,577,315 | 12/1951 | Ellerbeck | 222/282 |
| 2,861,356 | 11/1958 | Lellep | 34/174 |
| 3,241,248 | 3/1966 | Gerlach et al. | 34/168 |
| 3,352,354 | 11/1967 | Brock | 414/287 X |
| 3,695,165 | 10/1972 | Siewkiewicz et al. | 99/472 |
| 3,833,137 | 9/1974 | Mathews | 414/287 |
| 4,227,448 | 10/1980 | Ronning | 99/472 |
| 4,445,282 | 5/1984 | Heinemans | 34/168 |
| 4,458,428 | 7/1984 | Saeman | 34/168 |
| 4,683,665 | 8/1987 | Geelen | 34/168 |

Primary Examiner—Timothy F. Simone
Attorney, Agent, or Firm—Hovey, Williams, Timmons & Collins

[57] ABSTRACT

A counterflow cooler for ventilation and cooling of hot, pelletized product is provided which includes a shiftable floor located beneath a negatively ventilated housing. The cooler is provided with a series of openings in the floor which both admit air into the housing and, during shifting of the floor, discharge a quantity of cooled pellets during each operating cycle. Deflectors located over the openings prevent unrestricted discharge of pellets through the openings. The counterflow cooler is designed to selectively discharge pellets through the floor of the cooler after the pellets have been ventilated and cooled so that the pellets are subjected to minimal thermal stress.

14 Claims, 2 Drawing Sheets

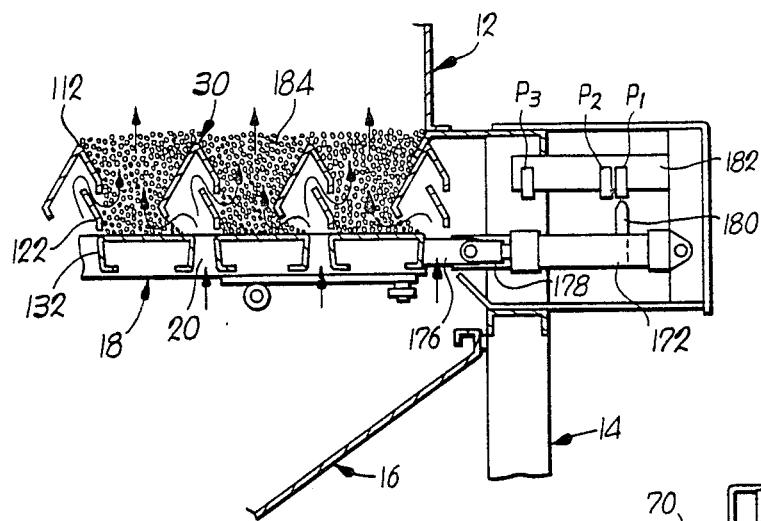
Fig. 4.
Fig. 3.
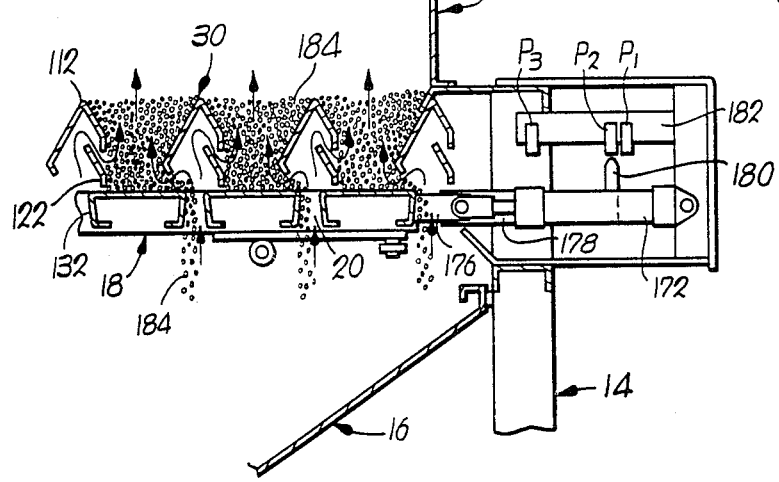
Fig. 5.
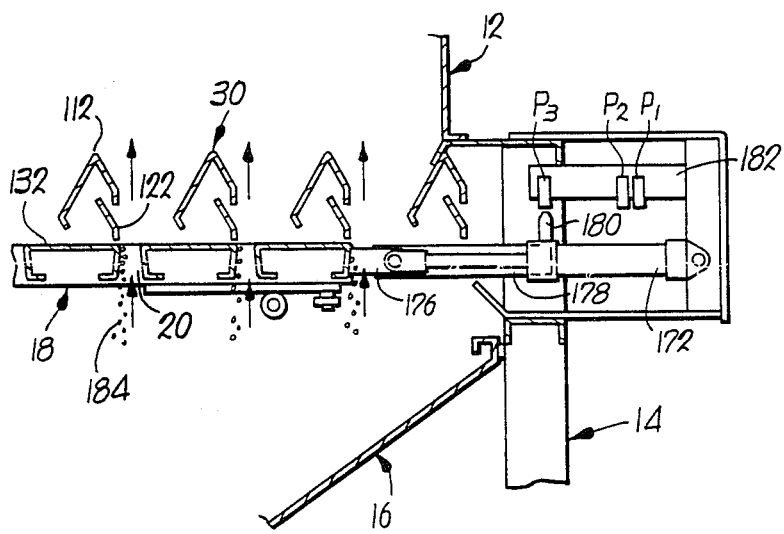
Fig. 6.

COUNTERFLOW COOLER FOR PELLETS

BACKGROUND OF THE INVENTION

1. Field of the Invention

This invention relates to a counterflow cooler for gradually reducing the temperature of processed feed pellets. The cooler advantageously provides for a gradual cooling of the pellets by accumulating a quantity of pellets in a housing and circulating air through openings in a shiftable floor through the accumulated pelletized product to minimize thermal stress in the pellets. More particularly, it is concerned with a counterflow cooler for pellets which feeds and distributes pellets into a housing until the pellets have accumulated to a specific level and are detected by a limiting sensor, thereafter cyclicly discharging a portion of the pellets through the openings while air is drawn through the openings, cooling the pellets and transferring heat to the circulating air. The pellets are cooled and gradually discharged as deflectors located over the openings permit only a portion of the pelletized product to be discharged into a hopper beneath the cooler during each cycle.

2. Description of the Prior Art

Animal feeds have long been available in processed, pelletized form. The pellets contain a wide range of ingredients and are available in a multiplicity of sizes from small pellets for feeding rabbits and the like, to dog food, and ultimately large range cubes for horses and cattle which can be from one to two inches long and three-quarters of an inch in width or diameter. After blending the ingredients and forming the pellet through a mold or by extrusion, the pellets are commonly heated or "cooked" to solidify the pellet.

The pellets leaving the processing plant are still hot, having a temperature of 160° F. to 220° F. If stored directly in a bin, they are subject to spoilage due to moisture accumulation and migration in the warm pellets. Moisture tends to accumulate when pellets cool over a long period, and when coupled with the warm temperatures, such protracted cooling produces spoiled pellets which are unsuitable for use.

To overcome this problem of spoilage, pellet coolers have heretofore been provided which circulate air through the pellets as they leave the production facility. One type of pellet cooler has employed a perforated conveyor which circulates air through the pellets as they are carried by the conveyor toward a hopper or bin. Another type of cooler employs a fan mounted in the bottom of a housing which draws air down through a perforated floor or grate. The pellets are fed from the top and emptied from the bottom of the grate.

Counterflow coolers, which gradually reduce the temperature of pelletized products, lessen the thermal stresses by circulating ambient air directly to a hot pellet. Counterflow coolers draw ambient air up through the pellet mass to exchange heat between the air and the pellets with the air gradually warming as it circulates into and through the pellet mass. The coolest ambient air thus circulates around the coolest pellets and accumulates heat as it moves through the pellet mass before encountering the hottest pellets. Thermal stress in the pellets is thereby minimized, resulting in fewer cracked and broken pellets.

However, to discharge the cooled pellets, some of the prior counterflow coolers relied on a plurality of gratings in which one of the grates was movable and shifted laterally relative to the other grates. The gratings of prior coolers have not been provided with an adjustable length of travel according to pellet size and have thus had difficulty in accommodating pellets of different sizes. The multiple gratings resulted in larger cubes being broken or trapped between the gratings and increased breakage of all sizes of cubes or pellets due to oscillation of the product caused by the shifting of one grate relative to the others. In addition, a more effective method of directing ventilation throughout the pellet mass was desired to ensure uniform cooling throughout the pelletized product. Prior coolers failed to provide for a uniform distribution of pellets within the cooler resulting in an uneven airflow through the pellets and an uneven rate of pellet cooling.

SUMMARY OF THE INVENTION

The problems outlined above are in large measure solved by the counterflow cooler made in accordance with the present invention. That is, the present cooler effectively cools the pellets through counterflow ventilation and thereby avoids stressing the pellets while requiring a minimum of moving parts. The cooler is provided with an improved means of air distribution, resulting in a uniform and efficient cooling of the pelletized product. The cooler is able to accommodate pellets of a wide variety of shapes and sizes at different rates of intake.

The counterflow cooler broadly includes an elevated storage housing for receiving the pellets therein, a pellet inlet, an adjustably shiftable floor provided with a plurality of pellet-discharge openings therein, an air and pellet deflector located over the openings, and an air discharge outlet located above the floor and adapted to discharge air from the housing. Preferably, the housing is substantially airtight save for the discharge outlet and pellet discharge openings, with pellet levels in the housing maintained within predetermined limits by limit switches for sensing the height of the pellets in the housing. The limit switches may be adjusted to accommodate pellets of different sizes. The shiftable floor is designed to discharge selected quantities of pellets through the openings as the floor shifts beneath the pelletized product mass. The deflectors serve to prevent the pellets from shifting with the floor and, as a result, a portion of pellets are discharged. The pellet inlet is perferably substantially airtight and includes a distributor to spread the pellets throughout the hopper. The distributor ensures that the pellets are spread evenly through the hopper for a uniform resistance to airflow through the pelletized product mass and an even rate of cooling. Since a portion of dust or finings is produced with the pellets, the distributor also aids in preventing the finings from accumulating in the center of the housing and the pellets rolling toward the walls of the housing.

BRIEF DESCRIPTION OF THE DRAWINGS

FIG. 3 is a top plan view of the pellet distributor located in the top of the housing showing a fragmentary section of the roof over one of the arms supporting the distributor;

FIG. 4 is an enlarged, fragmentary vertical sectional view of the deflectors and floor in a closed position;

FIG. 5 is an enlarged, fragmentary vertical sectional view of the deflectors and floor, with the floor shifted into an open, operating position; and FIG. 6 is an enlarged, fragmentary vertical sectional view of the deflectors and floor, with the floor shifted into an open, cleaning position.

DESCRIPTION OF THE PREFERRED EMBODIMENT

Figure 1:
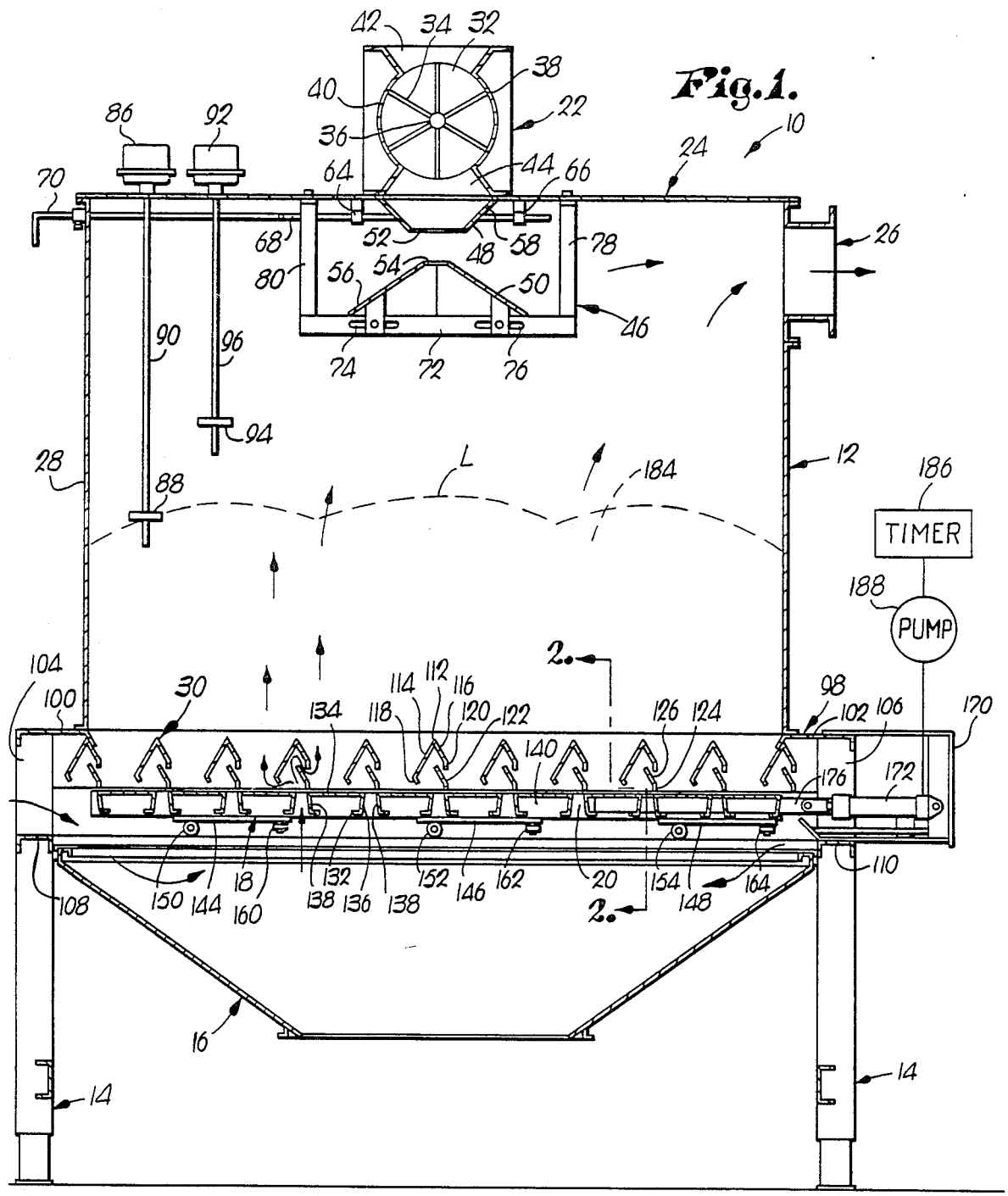
FIG. 1 is a vertical sectional view of the counterflow cooler showing in phantom the working level L of the pelletized product mass in the housing.
Figure 2:
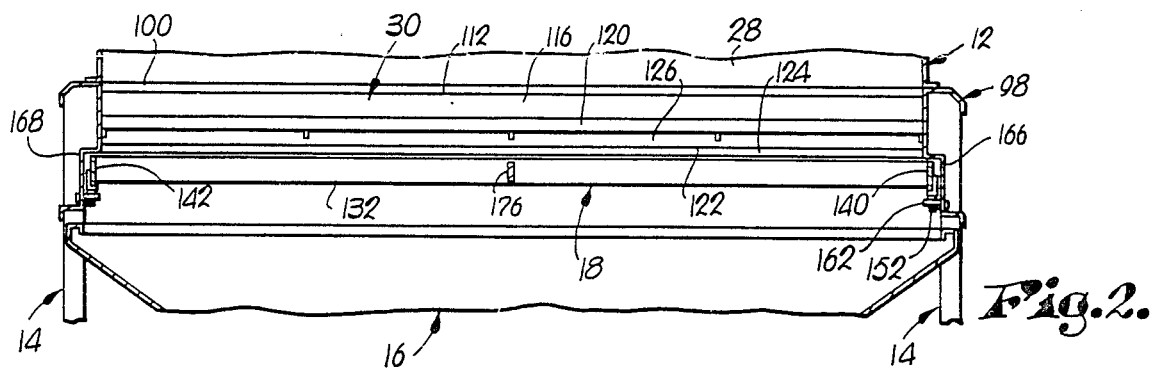
FIG. 2 is a fragmentary sectional view taken along line 2—2 of FIG. 1, which illustrates the deflector and floor as supported from the sides of the cooler.

Referring now to the drawings, a counter-flow cooler for pellets 10 broadly includes an elevated housing 12 supported by pillars 14 and overlying a hopper 16. Separating the housing 12 from the hopper 16 is a shiftable floor structure 18 defining a series of openings 20 therethrough. A rotary inlet valve 22 for admitting pelletized product into the housing 12 is mounted on the roof 24 of the housing 12. The housing is negatively ventilated through the outlet 26 by a conventional exhaust fan (not shown).

In greater detail, housing 12 is constructed of wall sections 28 and roof 24 over floor 18. Housing 12 is mounted on pillars 14 to extend above deflectors 30. Wall sections 28 and roof 24 are conventionally constructed of sheet metal and fastened together by bolts or other fastening means so as to be substantially airtight with the only significant airway being outlet 26. Housing 12 may be circular, rectangular, square, octangular or any other shape in plan as desired.

Rotary inlet valve 22 is mounted on the roof 24 to receive hot (160° F. to 220° F.) pellets from a processing facility. Rotary inlet valve 22 includes a revolving door 32 rotatable about a horizontal axis and having at least three and preferably six panels 34 rotating about a hub 36. At least some of the panels have their distal margins 38 adjacent each of the opposed arcuate wall members 40 at any position of rotation of the door 32, thereby effecting a seal to prevent the free circulation of air through the inlet valve 22. The inlet valve 22 is open at the top 42 and the bottom 44 thereof to permit pelletized product to enter the inlet valve 22 and be discharged into the housing 12. The door 32 is powered by a suitable electric or hydraulic motor which may be switched off thereby stopping the rotation of the door 32 in the event that the level L of the pelletized product in the hopper 12 is too high.

Outlet 26 is located at the top of wall 28 and housing 12, but may be positioned anywhere on wall section 28 or roof 24 which is above the level L at any time during operation of the cooler 10. Below inlet valve 22 is a distributor 46, for spreading the pelletized product throughout housing 12. The distributor 46 includes a pair of shiftable, opposed, tetrahedral pyramids 48 and 50, each defining a port in the apex to pass pelletized product therethrough. Upper pyramid 48 is provided with a larger port 52 than the port 54 in lower pyramid 50. The inclined side walls 56 of lower pyramid 50 which define port 54 are larger than the inclined walls 58 which define port 52 in upper pyramid 48. Upper pyramid 48 is shiftably mounted to the roof 24 by a set of brackets 60, 62, 64 and 66 and angularly displaced 45° to lower pyramid 50 as shown in FIGS. 1 and 3. A framework 68 is welded to the upper pyramid and carried by the brackets, and is provided with a control rod 70 which extends through sidewall 28 to permit the upper pyramid 48 to be shifted from side to side with respect to housing 12 as shown in FIG. 1.

Lower pyramid 50 may be shifted laterally on pins extending through slots 74 and 76. Yet further, lower pyramid 50 may be shifted transversely to the direction of movement of upper pyramid 48. Beam 72 is supported by arms 78 and 80 shiftably connected to the roof 24. As shown in FIG. 3, a transverse slot 82 is provided in the section of the roof 24 for shiftable attachment of each of the arms 78 and 80 along the transverse slot 82 and for suspension of the arms by a bolt 84 or other suitable connector.

Mounted to the roof 24 are a pair of switches for detecting the level L of the pelletized product. Lower level switch 86 is provided with a pedal 88 adjustably mounted to a rod 90, and upper level switch 92 is similarly provided with a pedal 94 adjustably mounted to rod 96. Each of the rods 90 and 96 extend through roof 24 to be rotatably driven by the switches 86 and 92.

Housing 12 may be of any configuration in plan and is mounted above shiftable floor enclosure 98 which is substantially rectangular in plan. Enclosure 98 is connected to pillars 14 and extends beyond wall sections 28 to permit floor structure 18 to shift laterally within enclosure 98. Flanges 100, 102 at the ends of enclosure 98 are mounted on top of pillars 14 and cooperate with deflectors 30 to support wall 28 while preventing the pelletized product from escaping between wall 28 and deflector 30. Open areas 104, 106, defined by the pillars 14 and flange 100 and cross member 108 and flange 102 and cross member 110 respectively, are open at the ends of the enclosure 98 to admit ambient air beneath floor structure 18.

Extending laterally below housing 12 and across enclosure 98 are a series of deflectors 30 for both distributing air entering through openings 20 and deflecting pelletized product away from the openings 20 when the floor structure 18 is in a first, closed position. The deflectors 30 include a first, substantially V-shaped member 112 with one leg 114 substantially longer than the other leg 116, each leg 114, 116 terminating in a stretch 118 and 120 angled obliquely with respect to the legs 112, 114 respectively.

A second deflecting member 122 spans across enclosure 98 and below housing 12 parallel to and substantially beneath shorter leg 116. Second deflecting member 122 includes a substantially vertical stretch 124 and an angled portion 126. V-shaped members 112 and deflecting members 122 are spaced apart to define airways 128 and 130 as air enters from openings 20 or open areas 104 and 106.

Floor structure 18 includes a series of spaced apart, parallel, coplanar channels 132, each presenting a platform 134 and ribs 136, 138. Vertical stretches 124 are juxtaposed to platform 134 so as to provide a barrier to the passage of pelletized product between stretch 124 and the platform 134. Ribs 106, 108 are angled to define a convergent opening 20 as ambient air is drawn up into the housing 12.

The individual channels 132 are joined together at their ends by supports 140, 142. Angles 144, 146 and 148 are joined to support 140 with corresponding angles joined to support 142. Vertical wheels 150, 152 and 154 rotate on axles attached angles 144, 146 and 148 and, together with corresponding wheels and axles on angles joined to support 142, enable floor 18 to shift along tracks 156, 158. Wheels 150, 152 and 154 rotate on horizontal axles, while horizontal wheels 160, 162 and 164 rotate on vertical axles and maintain supports 140, 142 in spaced relationship to sidewalls 166, 168. Hopper 16 extends beneath sidewalls 166, 168 to direct the cooled pelletized product to a suitable bin or receptacle located beneath the open bottom of the hopper 16.

Mounted on channel 110 is a bracket 170. A stationary end of a bi-directional hydraulic cylinder 172 is coupled thereto by conventional means such as bolting the cylinder to the bracket as shown in FIG. 1. As shown in greater detail in FIGS. 4–6, the shaft 174 of the hydraulic cylinder 172 is attached to a tang 176 extending horizontally from floor 18. As shaft 172 extends and retracts, floor 18 is thus shifted to move along tracks 156, 158. An L-shaped bar 178 is also mounted to tang 172 and extends toward the bracket 170. A toe 180 on the L-shaped member extends upwardly towards three proximity switches $P_1$, $P_2$ and $P_3$. Switches $P_1$, $P_2$ and $P_3$ may be of any conventional type such as mercury or magnetic proximity switches, or alternately contact or photoelectric switches may be substituted. The switches $P_1$, $P_2$ and $P_3$ are adjustably mounted on beam 182 to be appropriately positioned thereon. Additional proximity switches may be mounted on the beam 182 to enable an operator to preset the cooler 10 for different sizes of pelletized product 184 to be discharged therethrough.

In operation, switch $P_2$ is positioned on bar 182 according to the size of pellet desired to be cooled, with larger pellets requiring a greater distance between $P_1$ and $P_2$. Pedals 88 and 94 are adjusted on rods 90 and 96 respectively, with pedals 88 and 94 positioned higher on rods 90 and 96 when larger sizes of pellets requiring longer periods of cooling are to be discharged at the same capacity as smaller pellets. Air is drawn up through the openings 20 and around deflectors 30 into housing 12 and then discharged from the housing through outlet 26 by energizing a conventional fan (not shown) operably connected to the outlet 26. Pelletized product 184 is then fed into housing 12 through rotary inlet valve 22. The pelletized product 184 is distributed in the housing 12 as it falls through port 52 and slides along sidewall 58 with a portion of the pelletized product 184 also falling through lower port 54. Pelletized product 184 is thus evenly distributed throughout the housing 12 as it falls around and through lower pyramid 50. Should additional distribution be desired, upper pyramid 48 may be shifted laterally by means of control rod 70 to more evenly distribute the product, or lower pyramid may be shifted transversely by means of the bolts 84 or other suitable connectors extending through slots 82, thus causing arms 78 and 80 to move lower pyramid 50 transversely. The floor 18 remains in a first, closed position as shown by FIG. 4 until the pelletized product mass accumulates to level L and reaches pedal 88 of lower level switch 86.

As product 184 accumulates in housing 12, air is drawn up through openings 20 and diverted by deflectors 30 as indicated by the arrows in the drawing. Air circulates evenly up through the accumulated pelletized product 184, and as the air rises through the product 184, it gains heat from the pellets and ultimately exits the housing 12 through outlet 26.

When sufficient pelletized product 184 has accumulated to engage pedal 88, pedal 88, which is rotatably driven by switch 88, contacts the accumulated product mass 184, thus stopping rod 90. When rod 90 stops rotating, switch 86 provides an electrical signal to a hydraulic circuit, including a pump 188 and a solenoid, to extend the shaft 174 of hydraulic cylinder 172 and thereby shift floor 18 to the left into the position shown in FIG. 5. In the present invention, floor 18 will shift approximately 30 to 50 millimeters during a normal discharge stroke. As floor 18 shifts, a portion of the pelletized product 184 falls downward through opening 20 as shown in FIG. 5. As the shaft 174 continues to extend, toe 180 is detected by proximity switch $P_2$. Switch $P_2$ in turn signals the solenoid in the hydraulic circuit to reverse the direction of the hydraulic cylinder and thus shaft 174 begins to reciprocate back into hydraulic cylinder 172. Floor 18 thus begins to shift to the right as shown in FIGS. 1, 4 and 5 until toe 180 is detected by proximity switch $P_1$. As shaft 174 reciprocates back into hydraulic cylinder 172, floor 18 returns to the first, closed position as shown in FIG. 4. Switch $P_1$ again signals the solenoid in the hydraulic circuit to reverse the direction of travel of the shaft 174 in the next cycle and sends a signal to a timer 186 to determine the interval before the hydraulic cylinder 172 begins another stroke to shift the floor 18. The timer may be set manually to determine the interval between discharge strokes as determined by the rate of pellet intake. Once the timer 186 has counted off the desired interval, it signals the hydraulic pump 188 to again energize the hydraulic cylinder 172 and repeat the cycle. The solenoid in the hydraulic circuit, having reversed the direction of the hydraulic cylinder, thus causes shaft 174 to begin its extension to discharge further pelletized product 184.

During each cycle, a portion of the product 184 is discharged through openings 20. As the product adjacent an opening 20 falls therethrough, and the platforms 134 and ribs 136, 138 defining the openings 20 shift underneath the product 184, additional product 184 slides down deflectors 30 to replace that product 184 which has fallen through each opening 20. Since product 184 is deposited on the top of the pelletized product mass at level L, the product 184 nearest the floor is cooler than the product deposited on the top as it has been subject to ventilation for the longest period A portion of the pelletized product 184 rolls sideways on an incline when unrestrained by a vertical support until it forms a sloping mass of product as shown in FIG. 4. Thus it is unnecessary to shift the floor 18 so that the openings 20 are moved out from underneath the deflectors 30, as a portion of the pelletized product 184 falls through the openings 20 during each cycle and is replaced by additional pellets as shown in FIG. 5.

During operation, the timer may be set from one to ten seconds to determine the interval between each cycle. The delay between each cycle may be selectively set according to the amount of product entering through rotary inlet valve 22.

When pelletized product 184 is being fed into the housing 12 too rapidly, the level L of pelletized product 184 will rise until level L reaches pedal 94. When this occurs, Pedal 94 and rod 96 stop rotating, which is detected by upper level switch 92. Upper level switch 92 will signal an alarm and shut down the power to rotary inlet valve 22 and to the pellet processing plant until sufficient pelletized product 184 is discharged through openings 20 to disengage upper level switch 92 and permit the resumption of pellet intake.

Inasmuch as the pelletized product 184 may vary greatly in size, the length of the normal operating stroke of shaft 174 and thus the distance traveled by the shiftable floor 18 may be varied by moving proximity shift $P_2$ according to the desired length of travel of the floor 18 during a single stroke. Pelletized product of less than ten millimeters in diameter is discharged by a stroke of 30 millimeters, while pelletized product greater than ten millimeters in diameter is discharged by a stroke of 50 millimeters. Neither of these normal operating strokes is of sufficient length to cause openings 20 to be displaced from underneath deflectors 30.

When the supply of hot, pelletized product 184 stops, the discharge of pelletized product 184 continues until the level L decreases in height to below that which may be detected by pedal 88. To discharge the remaining pelletized product, the operator engages a clearing switch which continuously cycles the hydraulic cylinder 172. When the clearing switch is activated, the timer is bypassed, thus permitting the hydraulic cylinder to operate continuously in a normal operating cycle as toe 180 moves between proximity switches $P_1$ and $P_2$. The hydraulic cylinder 172 continues with a normal operating stroke discharging a quantity of pelletized product 184 during each cycle until substantially all of the pelletized product 184 is discharged from the housing 12.

To discharge the remaining pelletized product 184, floor 18 is shifted in a clearing stroke as shown in FIG. 6. Proximity switch $P_2$ is bypassed as the cleaning switch is engaged, and the floor 18 is driven by shaft 174 in the maximum cleaning stroke of 200 millimeters until proximity switch $P_3$ detects toe 180. Openings 20 then shift across the distance between adjacent deflecting members 122 and are exposed beyond vertical planes extending from the horizontal margins of V-shaped members 112 so as to discharge the remaining pelletized product 184. The cleaning stroke has stopped when toe 180 activates proximity switch $P_3$, signalling the solenoid in the hydraulic circuit to return the shaft 174 to a closed position as shown in FIG. 4. After the final cleaning stroke, counterflow cooler 10 is ready for an additional charge of pelletized product 184.

From the foregoing, it may be appreciated that V-shaped member 112 and deflecting member 122 act not only to divert and divide the passage of air as shown by the arrows in the drawing, but also prevent the pelletized product 184 from falling directly through openings 20 when the floor 18 is in the normal operating mode. During normal operation, the floor 18 is shifted only a relatively short distance of 30 to 50 millimeters, permitting only a portion of the pelletized product 184 to be discharged during a single stroke, as shown in FIG. 5. During normal operations, the openings 20 do not shift so as to be exposed beyond a vertical plane extending from the horizontal margins of V-shaped member 112. V-shaped member 112 and deflecting member 122 prevent the pelletized product 184 from moving with the floor 18 as it shifts, thereby causing a portion of pelletized product 184 to be discharged during each cycle. During the cleaning cycle, the deflecting member 122 acts as a barrier to scrape the remaining pelletized product 184 into the openings 20 as the openings 20 shift toward deflecting member 122.

As discussed herein, pelletized product 184 refers to a variety of processed materials, whether they be granular, pelletized, cubed or formed in any other shape or size. The counterflow cooler 10 hereof is adaptable to cool a variety of products and is not intended to be limited solely to products in the shape of a "pellet".

I claim:

1. A counterflow cooler for pelletized products comprising:

a. a housing having an outlet for discharging air therethrough;
  b. inlet means for introducing pelletized product into said housing;
  c. shiftable floor beneath said housing defining a plurality of openings adaptable to admit air and discharge said pelletized product therethrough;
  d. deflector means located over said openings during at least portion of an opening cycle, said deflector means being spaced from said floor and cooperating with said floor to selectively discharge a quantity of pellets through said openings;
  e. means for shifting said floor relative to said deflector means; and
  f. means for selectively varying the distance traveled by said floor during shifting.

2. A counterflow cooler as set forth in claim 1 wherein said inlet means are adapted to prevent the continuous circulation of air therethrough.

3. A counterflow cooler as set forth in claim 2 wherein said inlet means comprises a door including plurality of panels rotatable about a single axis, at least two of said panels being adjacent to opposed arcuate wall members at any position of the rotation of the door.

4. A counterflow cooler as set forth in claim 1 further comprising distribution means located proximate to said inlet means for distributing pelletized product throughout said housing.

5. A counterflow cooler as set forth in claim 4 wherein said distribution means comprises a pair of opposed inclined wall structures each defining a pellet accommodating port therewithin.

6. A counterflow cooler as set forth in claim 5 wherein said distribution means comprises a pair of opposed, offset, tetrahedral pyramids each defining a port at the apex thereof of sufficient size to pass pelletized product therethrough.

7. A counterflow cooler for pelletized products comprising:

a. a housing having an outlet for discharging air therethrough;
  b. inlet means for introducing pelletized product into said housing;
  c. a shiftable floor beneath said housing defining a plurality of openings adaptable to admit air and discharge said pelletized product therethrough;
  d. deflector means located over said openings during at least a portion of an operating cycle, said deflector means being spaced from said floor in and cooperating with said floor to selectively discharge a quantity of pellets through said openings;
  e. means for shifting said floor relative to said deflector means; and
  f. means for sensing the quantity of the pelletized product in said housing, said sensing means being operatively coupled to said shiftable floor.

8. A counterflow cooler as set forth in claim 7 wherein said sensing means comprises a first limit switch for detecting a first, lower product level in said housing, and a second limit switch for detecting a second, upper product level in said housing, said first limit switch being in communication with said shifting means, said second limit switch being in communication with said inlet means.

9. A counterflow cooler for pelletized products comprising:

a. a housing having an outlet for discharging air therethrough;
b. inlet means for introducing pelletized product into said housing;
c. a shiftable floor beneath said housing defining a plurality of openings adaptable to admit air and discharge said pelletized product therethrough;
d. deflector means located over said openings during at least a portion of an opening cycle, said deflector means being spaced from said floor in and cooperating with said floor to selectively discharge a quantity of pellets through said openings; and
e. means for shifting said floor relative to said deflector means,
f. said deflector means including first and second deflector means relative to each of said openings, said first deflector including an inverted V-shaped member with one leg of said member longer than the other leg of said member, said second deflector including an inclined panel located beneath said first deflector and angled toward the longer of the legs.

10. A counterflow cooler for pelletized products comprising:
a. a housing having an outlet for discharging air therethrough;
b. inlet means for introducing pelletized product into said housing;
c. a shiftable floor beneath said housing defining a plurality of openings adaptable to admit air and discharge said pelletized product therethrough, said openings defined by said floor remaining located beneath said deflectors during normal operation, said floor being shiftable laterally with respect to said housing by a hydraulic cylinder operably coupled to said floor;
d. deflector means located over said openings during at least a portion of an operating cycle, said deflector means being spaced from said floor and cooperating with said floor to selectively discharge a quantity of pellets through said openings; and
e. means for shifting said floor relative to said deflector means, said means comprising a hydraulic cylinder operably coupled to said floor for shifting said floor laterally with respect to said housing, the distance said floor travels during shifting of said floor being controlled by switches operably coupled to said floor.

11. A counterflow cooler for pelletized products comprising:
a. a housing having an outlet for discharging air therethrough;
b. inlet means for introducing pelletized product into said housing;
c. a shiftable floor beneath said housing defining a plurality of openings adaptable to admit air and discharge said pelletized product therethrough;
d. deflector means located over said openings during at least a portion of an operating cycle, said deflector means being spaced from said floor and cooperating with said floor to selectively discharge a quantity of pellets through said openings; and
e. means for reciprocally shifting said floor relative to said deflector means through a plurality of successive intermittent strokes.

12. A counterflow cooler as set forth in claim 16, including means for varying the interval between successive intermittent strokes.

13. A counterflow cooler for pelletized products comprising:
a. a housing having an outlet for discharging air therethrough;
b. inlet means for introducing pelletized product into said housing;
c. a floor beneath said housing defining a plurality of openings adaptable to admit air and discharge said pelletized product therethrough;
d. deflector means located over said openings during at least a portion of an operating cycle, said deflector means being spaced from said floor in and cooperating with said floor to selectively discharge a quantity of pellets through said openings;
e. means for accomplishing relative movement between the floor and the deflector means for permitting selective discharge of said pelletized product through said openings; and
f. means for sensing the quantity of pelletized product in said housing, said sensing means being operably coupled to said means for accomplishing the selective movement between the floor and the deflector means.

14. A counterflow cooler for pelletized products comprising:
a. a housing having an outlet for discharging air therethrough;
b. inlet means for introducing pelletized said housing;
c. a floor beneath said housing defining a plurality of openings adaptable to admit air and discharge said pelletized product therethrough;
d. deflector means located over said openings during at least a portion of an operating cycle, said deflector means being spaced from said floor in and cooperating with said floor to selectively discharge a quantity of pellets through said openings: and
e. means for accomplishing relative reciprocal movement between said floor and said deflector means through a plurality of successive intermittent strokes.

* * * * *